(12) United States Patent
Barabash et al.

(10) Patent No.: US 9,571,300 B2
(45) Date of Patent: Feb. 14, 2017

(54) REDUCING ENCAPSULATION OVERHEAD IN OVERLAY-BASED NETWORKS

(71) Applicant: International Business Machines Corporation, Armonk, NY (US)

(72) Inventors: Katherine Barabash, Haifa (IL); Rami Cohen, Haifa (IL); Sergey Guenender, Haifa (IL); Liane Lewin-Eytan, Binyamina (IL); Eran Raichstein, Yokneam Ilit (IL); Liran Schour, Harduf (IL)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 14/262,806

(22) Filed: Apr. 28, 2014

(65) Prior Publication Data
US 2015/0312054 A1    Oct. 29, 2015

(51) Int. Cl.
*H04L 12/28* (2006.01)
*H04L 12/46* (2006.01)
*H04L 29/12* (2006.01)

(52) U.S. Cl.
CPC ......... *H04L 12/4633* (2013.01); *H04L 61/103* (2013.01)

(58) Field of Classification Search
CPC ....................................................... H04L 45/00
USPC ......................................................... 370/392
See application file for complete search history.

(56) References Cited

U.S. PATENT DOCUMENTS

| | | | |
|---|---|---|---|
| 8,224,971 B1 * | 7/2012 | Miller | H04L 12/66 370/254 |
| 8,510,420 B1 | 8/2013 | Brandwine et al. | |
| 8,600,726 B1 * | 12/2013 | Varshney | H04L 69/18 703/26 |
| 8,819,211 B2 | 8/2014 | Barabash et al. | |
| 9,313,096 B2 | 4/2016 | Barabash et al. | |
| 9,313,097 B2 | 4/2016 | Barabash et al. | |

(Continued)

FOREIGN PATENT DOCUMENTS

| | | |
|---|---|---|
| CN | 102780601 A | 11/2012 |
| CN | 102780758 A | 11/2012 |
| CN | 103856350 A | 6/2014 |

OTHER PUBLICATIONS

Davie et al., "Tunneling for Network Virtualization", Network Heresy—Tales of the network reformation, Oct. 15, 2012, Can be found at : http://networkheresy.com/2012/10/15/tunneling-for-network-virtualization/.

(Continued)

*Primary Examiner* — Samina Choudhry
(74) *Attorney, Agent, or Firm* — Erik K. Johnson

(57) ABSTRACT

Machines, systems and methods for efficient data communication are provided. The method comprises receiving a data packet to be transmitted to a destination node in a overlay-based communications network, wherein the destination information is included in a virtual header that includes a virtual address of the destination node; determining a physical address of the destination node based on the virtual address of the destination node; replacing the virtual header for the received data packet with a physical header that includes the physical address; and transmitting the data packet over the communications network to a destination host based on the physical address included in the physical header.

17 Claims, 5 Drawing Sheets

(56) References Cited

U.S. PATENT DOCUMENTS

| | | | |
|---|---|---|---|
| 2004/0246964 A1 | 12/2004 | Grimminger et al. | |
| 2012/0290695 A1 | 11/2012 | Barabash et al. | |
| 2012/0291024 A1 | 11/2012 | Barabash et al. | |
| 2012/0297384 A1 | 11/2012 | Barabash et al. | |
| 2013/0091261 A1 | 4/2013 | Barabash et al. | |
| 2013/0091501 A1 | 4/2013 | Barabash et al. | |
| 2013/0339423 A1* | 12/2013 | Degtiarov | G06F 9/5072 709/203 |
| 2014/0056151 A1* | 2/2014 | Petrus | H04L 69/22 370/242 |

OTHER PUBLICATIONS

Barabash et al., "A case for overlays in DCN virtualization", DC-CaVES '11, Proceedings of the 3rd Workshop on Data Center—Converged and Virtual Ethernet Switching, 2001, pp. 30-37.

Lasserre et al., "Framework for DC Network Virtualization", Internet Engineering Task Force, Internet Draft, Jan. 2014. Can be found at : http://tools.ietf.org/html/draft-ietf-nvo3-framework-05.

Lewin-Eytan et al., "Designing Modular Overlay Solutions for Network Virtualization", IBM Research Report, Aug. 2011.

IBM, "IBM Software Defined Network for Virtual Environments", IBM Systems and Technology, Through Leadership White Paper, Jun. 2013.

Wikipedia, the free encyclopedia, "Software-defined networking", printed on Aug. 11, 2016, pp. 1-6, https://en.wikipedia.org/wiki/Software-defined_networking.

\* cited by examiner

REDUCING ENCAPSULATION OVERHEAD IN OVERLAY-BASED NETWORKS

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates to reducing encapsulation overhead in a centrally-controlled overlay-based network.

BACKGROUND

In modern, large-scale, virtualized, multi-tenant environments (e.g., enterprise data centers, private and public clouds, etc.), requirements towards the interconnect technology are different and more demanding than in traditional data centers. These requirements (i.e. multi-tenant isolation, management scalability, operational flexibility, etc.) call for virtualizing the networking infrastructure, where the compute and the storage resources are virtualized.

While there are multiple approaches to network virtualization, network virtualization solutions by many vendors involve overlays to achieve isolation and separation from the physical infrastructure and centralized control to achieve flexible and scalable controllability with the logically centralized controller commanding forwarding devices. A typical drawback associated with using overlays is the encapsulation overhead.

The overhead is manifested in (1) higher processing overheads in adding and removing encapsulation headers by forwarding devices, (2) increase in the packet size, and (3) additional fragmentation and disabling the hardware off-load engines. While smart encapsulation formats and offload techniques may be used to avoid fragmentation and benefit from hardware acceleration, such methods do not address the added overhead associated with the processing and large packet.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Machines, systems and methods for efficient data communication are provided. In accordance with one embodiment, the method comprises receiving a data packet to be transmitted to a destination node in a overlay-based communications network, wherein the destination information is included in a virtual header that includes a virtual address of the destination node; determining a physical address of the destination node based on the virtual address of the destination node; replacing the virtual header for the received data packet with a physical header that includes the physical address; and transmitting the data packet over the communications network to a destination host based on the physical address included in the physical header; wherein the virtual address of the destination node is determined based on the physical address included in the physical header when the data packet is received at the destination host, and wherein a payload included in the data packet is delivered to the destination node via the destination host based on the virtual address of the destination node.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
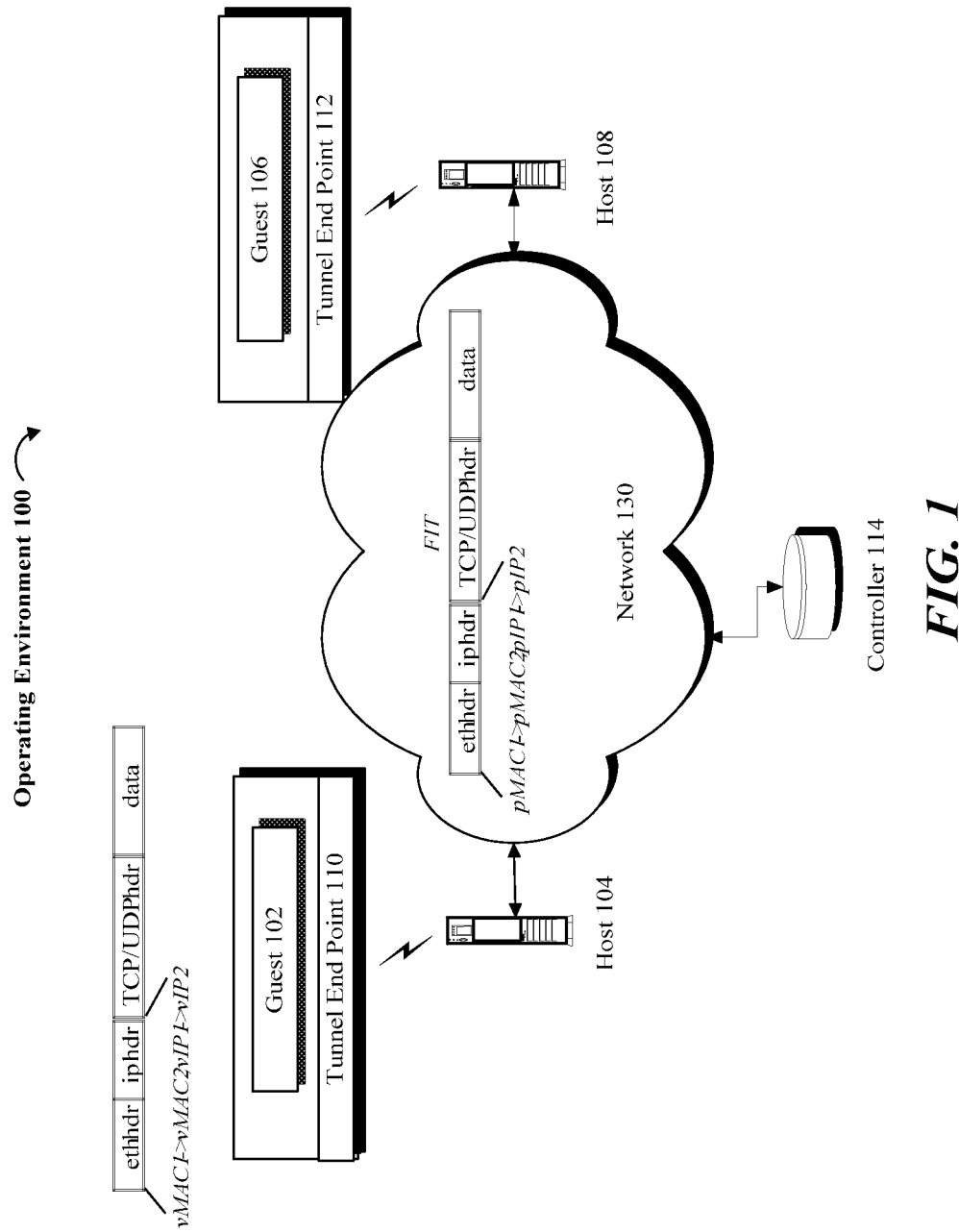
FIG. 1 illustrates an exemplary operating environment in accordance with one or more embodiments, wherein a data packet is delivered from a source node to a destination node.

Referring to FIG. 1, an operating environment 100 is illustrated in which an overlay-based virtually switched network 130 may be configured to transport data over an underlying physical infrastructure. As shown, a first guest (e.g., a virtual network guest) 102 may be executed on a first host 104 and a second guest 106 may be executed on a second host 108, wherein the first host 104, as a source node, may attempt to transmit data over network 130 to the second host 108, identified as a destination node based on a series of virtual or physical addresses.

It is noteworthy that a node in network 100 may be a virtual network node or a virtual network client (e.g., guest 102) generating packets to be delivered to other virtual network nodes using virtual addresses. A node may also refer to a physical network node (e.g., host 104) that hosts a virtual network node and routes packets on behalf of the virtual network node in the physical network, using physical addresses. A virtual tunnel end point 110 (e.g., encapsulating virtual switches) may be implemented in the physical network nodes to process and mange the delivery of data packets across network 130, as provided in further detail below.

In accordance with one embodiment, guest 102 may be a software application (e.g., a virtual machine (VM)) executed on host 104, where guest 102 generates a flow of data packets that are to be forwarded from source node (e.g., host 104) to a destination node (e.g., host 108). Data packets generated by guest 102 may include control information and payload data. The control information may include virtual addresses (vMAC, vIP, etc.) of the source and destination nodes and may be included in a portion of the data packet referred to as the header. Such a header may be referred to as a virtual header which may be concatenated to the payload.

Figure 2:
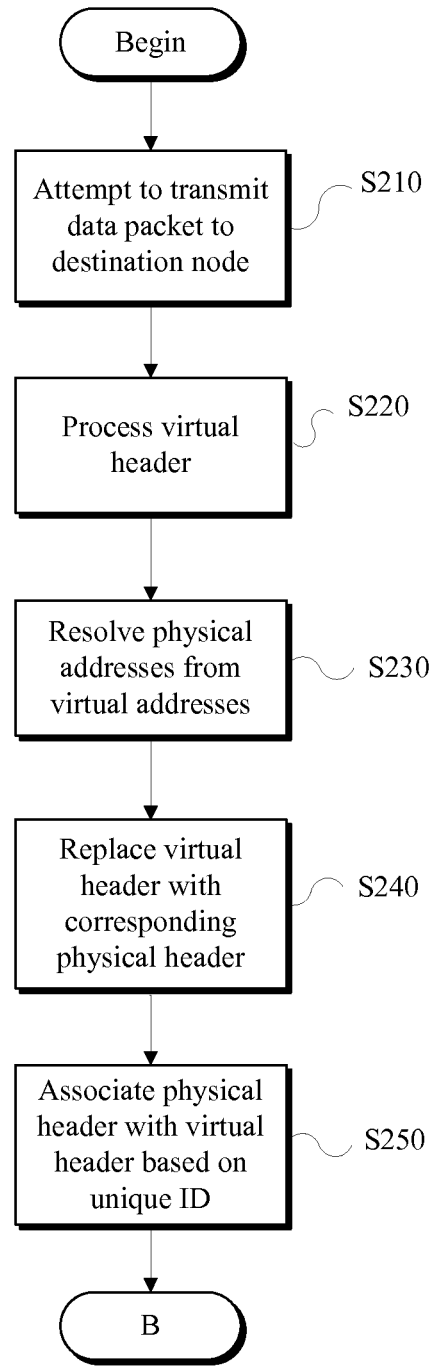
FIGS. 2 and 3 are flow diagrams of an example method for optimizing the delivering of a data packet from a source node to a destination node, in accordance with one embodiment.

Referring to FIGS. 1 and 2, for example, guest 102 may attempt to transmit to a destination node a data packet that includes a virtual header bearing the virtual address of guest 106 (e.g., vIP2 and vMAC2) (S210). In one embodiment, a processing module, such as a tunnel end point (TEP) 110 associated with host 104 may be configured to intercept the data packet generated by guest 102 and process the virtual header (S220). The processing of the data packet may be optionally performed based on exchanges between the source node (e.g., host 104/TEP 110) and a controller 114 that helps resolve corresponding physical addresses from the virtual addresses included in the virtual header (S230).

Resolving the physical addresses from the virtual addresses may be performed based on mapping information stored in a database (e.g., a mapping table) accessible by controller 114. In one embodiment, once the physical addresses for the destination node are resolved, the data packet payload may be packetized once again with the physical address (e.g., pIP2 and pMAC2) included in a second set of headers (e.g., eth2 hdr, ip2 hdr, etc.). The data packet may be then forwarded to the destination node with an external header (i.e., a "physical header") encapsulating an internal header (i.e., a "virtual header") and the payload.

The above process, involving a double header implementation (i.e., external-over-internal header encapsulation) for each data packet in the flow, is inefficient when it adds to network congestion or requires additional layers of depacketization at the forwarding and destination nodes. Additional inefficiencies may be introduced as a result of fragmentation in the physical network, due to the increased packet size. Moreover, high levels of processing overhead and resource utilization may be encountered, due to the need for copying packet data into memory during packetization and depacketization steps as a result of having to process the double header encapsulation.

In one or more embodiments, a more efficient process may be implemented by way of replacing a data packet's virtual header with a corresponding physical header (S240). As noted earlier, the virtual header may include virtual addresses (e.g., eth1 hdr, ip1 hdr, etc.) for the destination node; and the physical header may include physical addresses (e.g., eth2 hdr, ip2 hdr, etc.) for the destination node. Thus, instead of packetizing the payload in both an internal virtual header and an external physical header according to the double header implementation noted earlier, the virtual header including the virtual addresses may be dropped and the physical header including the physical headers may be used instead to packetize the payload.

The above header replacement implementation helps reduce the packetizing/depacketizing overhead by eliminating memory operations required to increased packet size and also helps reduce congestion of the data communications network as less bandwidth will have to be utilized for transferring header information. The above header replacement implementation is most efficient and advantageous for managing long data flows that include relatively small amounts of payload in each data packet. In such scenarios, transmitting and processing disproportionally large header data for a relatively small payload causes a toll on the communications networks available bandwidth and processing resources.

As such, in one example embodiment, the header replacement process is dynamically applied to selected flows that would most benefit from it. For example, a mechanism may be implemented (e.g., on a network node or on the controller 114) to analyze data flows over the network or the applications generating the data flows, the relevant historic data, etc. and to select to apply the above header replacement process to those flows that are, for example, expected to be at least one of longer than a certain threshold, have a low payload density, or meet other criteria that would make the flow a suitable candidate.

In one implementation, once a data packet's virtual header (i.e., a header that includes the virtual address of the destination host) is replaced with a physical header (i.e., a header that includes the physical address of the destination host), a unique identifier (e.g., a flow identification tag or FIT) may be used to associate the physical header information with the virtual header information (S250). The unique identifier may be stored in a database or a data structure (e.g., a mapping table) in association with one or more of the physical header and the virtual header. As provided in further detail below, the unique identifier may be used to retrieve the virtual header for the data packet, when the data packet is received at the destination node.

Figure 3:
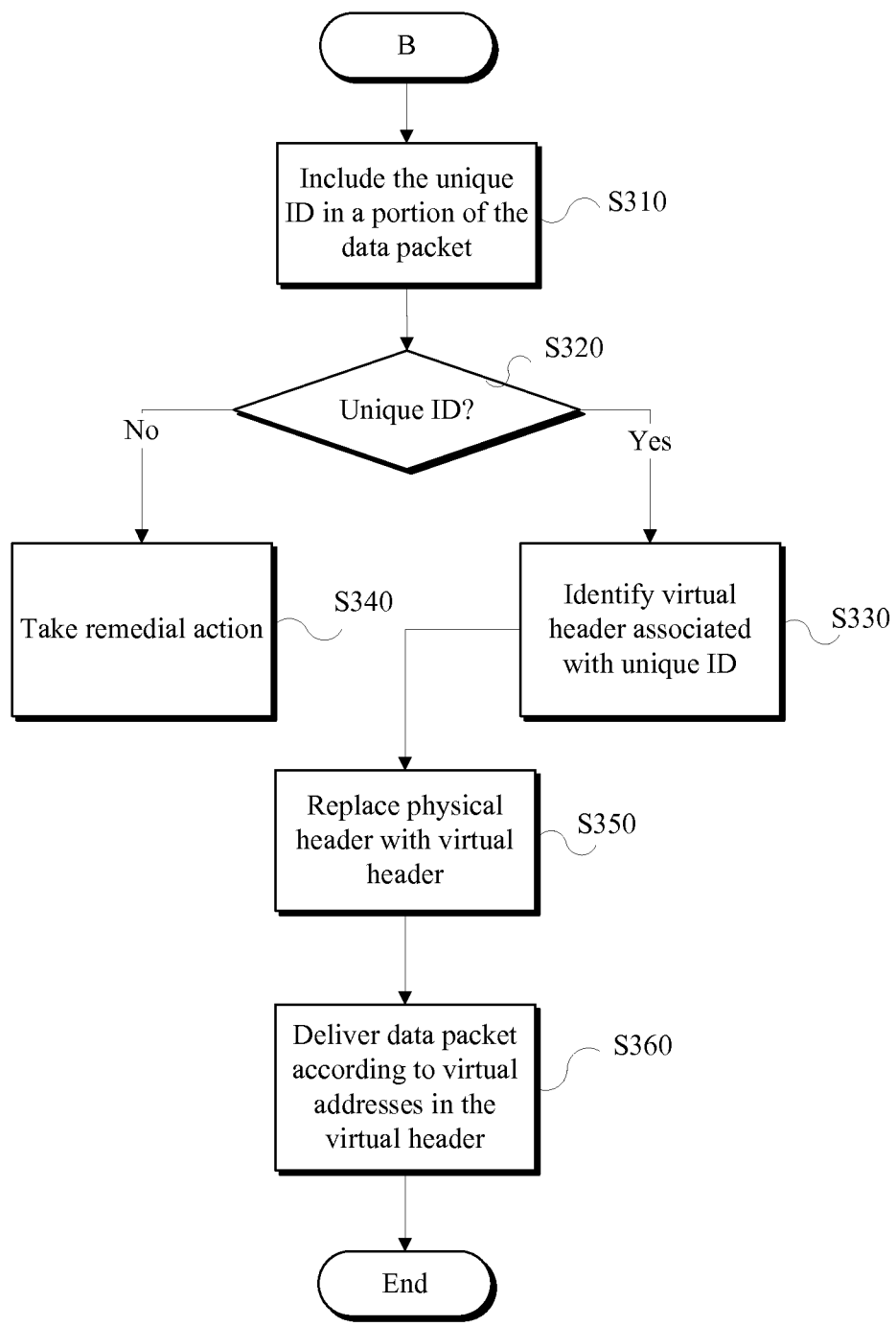

Referring to FIGS. 1 and 3, to provide the unique identifier to the destination node, in one embodiment, the unique identifier may be included in a predetermined portion of the physical header (e.g., in the TCP/UDP portion of the header, in the ip header, etc.) or in a newly created header portion for the data packet (S310). Once the data packet is received at the destination node, the header information is analyzed to find the unique identifier (S320). If found, the unique identifier is cross-referenced against the mapping data (i.e., in the mapping table) to identify the virtual addresses associated with the unique identifier (S330). Otherwise, depending on implementation, remedial actions may be taken (S340).

The identification of the virtual addresses based on the unique identifier may be performed based on an exchange between the destination node (e.g., host 108/TEP 112) and controller 114. In one implementation, the destination node may independently perform the identification without reliance on controller 114. Regardless, once the virtual header is identified, the destination host may strip the physical header from the data packet associated with the unique identifier and replace the physical header with a virtual header (S350). The virtual header would include the virtual addresses corresponding to the unique identifier included in the packet.

According to the above example methodology, the data packet that was transmitted over network 130 with a physical header encapsulating the payload is restored to a state in which the physical header is dropped and a virtual header encapsulates the payload. In this manner, a virtual header is concatenated to the payload at the destination node, where the virtual header includes the virtual destination address for the delivery of the data packet. TEP 112 may thus use the virtual address information in the virtual header to deliver the data packet to guest 106, for example (S360).

Advantageously, according to the above implementation, a data packet may be transmitted over the network encapsulated in a physical header (i.e., as opposed to a data packet encapsulated with both a physical header and a virtual header), wherein at the destination node, the virtual header associated with the physical header may be retrieved based on a unique identifier included in the data packet itself. In certain embodiments, without detracting from the scope of the claimed subject matter, the unique identifier may be delivered by way of an alternative mechanism other than that disclosed above. Regardless of the delivery mechanism, the unique identifier may be utilized to determine the virtual addresses corresponding to the physical addresses associated with a data packet delivered to the destination node.

Further, it is noteworthy that the logic for deriving the physical addresses from the virtual addresses associated with a data packet at the source node, as well as the logic for maintaining the mapping data that includes an association between the physical addresses and virtual addresses (based on the unique identifier) for a data packet may be implemented over a centralized controller (e.g., controller 114) or at the host level. As such, in accordance with one or more embodiments, the destination node may communicate with the source node to retrieve the virtual address information, or alternatively with a dedicated controller, or with both, depending on implementation.

It is noteworthy that, in the embodiment in which the controller is utilized, the controller may manage functions associated with resolving between physical and virtual addresses. For example, when a source node is replacing the virtual header with the physical header, prior to transmitting the data packet to the destination node, the source node may consult with the controller to determine the proper physical addresses that correspond to the virtual addresses in the virtual header for the data packet. Similarly, on the destination host, upon receiving the data packet with the physical header (which includes the unique identifier), the destination node may consult with the controller to determine the virtual addresses for the data packet based on the unique identifier.

The unique identifier may be unique, not necessarily across the entire network and for each data packet flow, but unique with reference to the particular source and destination hosts that are taking part in the header replacement process. As such, a relatively small binary number may be used to implement the unique identifier without having to add a substantial number of bits to the physical header. To introduce additional efficiency, caching mechanisms may be deployed on either the source node or the destination node, so that management policy information for a data flow is retrieved from the controller for the packets in the data flow.

In an implementation equipped with a cache mechanism, when data packets for the same flow are processed, the policy information (e.g., routing data, physical addresses, FIT if using header replacement scheme) for the destination node may be retrieved from the cache first. A cache hit would result, if the information is already in the cache based on processing a previous packet from the same flow. In case of a cache miss, controller 114 may be queried for the relevant control information. Such caching mechanism may be implemented for efficiency while allowing the controller to evict cached information (e.g., if the policy or the physical address is updated for a flow). The controller may dynamically revert the decision to use the header replacement for a particular flow by evicting a flow's cache entry, thus causing the node to query the controller when the next packet in the flow arrives.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
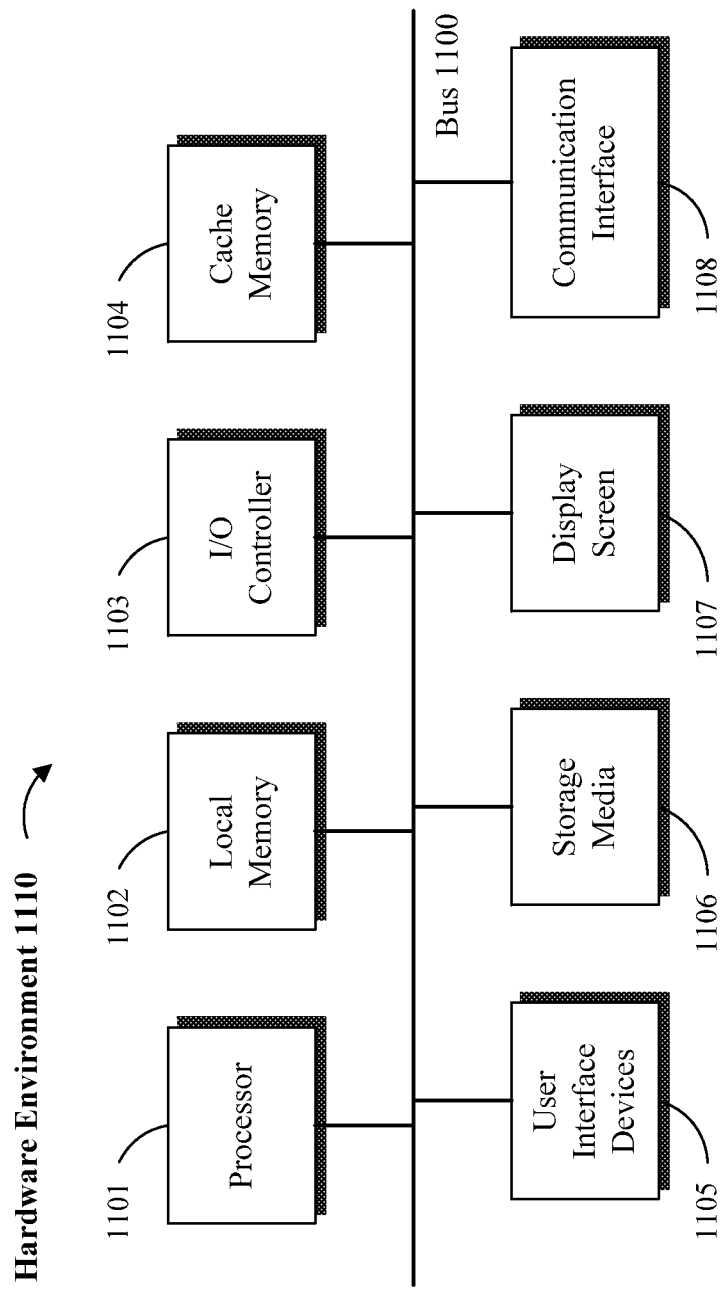
FIGS. 4A and 4B are block diagrams of hardware and software environments in which the disclosed systems and methods may operate, in accordance with one or more embodiments.
Figure 4B:
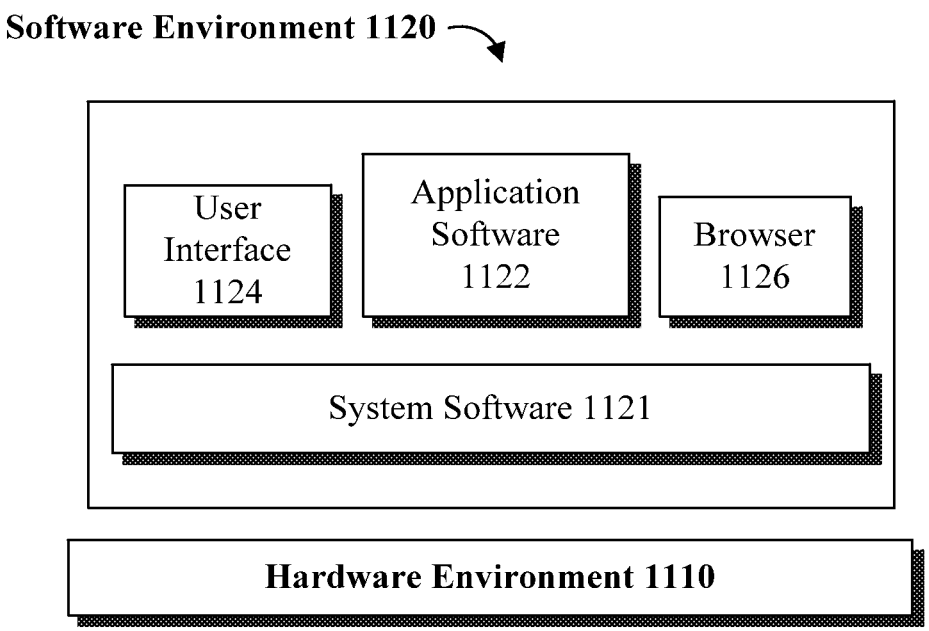

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for efficient data communication, the method comprising:
   receiving a data packet to be transmitted to a destination node in an overlay-based communications network, wherein the destination information is included in a virtual header that includes a virtual address of the destination node;
   determining a physical address of the destination node based on the virtual address of the destination node;
   determining a payload density of the data packet to be transmitted is below a threshold; based on determining the payload density is below threshold, replacing the virtual header for the received data packet with a physical header that includes the physical address and a unique identifier, wherein the unique identifier is determined based on the physical address included in the physical header and the virtual address included in the virtual header; and
   transmitting the data packet over the communications network to a destination host based on the physical address included in the physical header;
   wherein the virtual address of the destination node is determined based on the physical address included in the physical header when the data packet is received at the destination host, and
   wherein a payload included in the data packet is delivered to the destination node via the destination host based on the virtual address of the destination node.

2. The method of claim 1, wherein the virtual address of the destination node is used to resolve the physical address for the destination node based on correlation information included in a data structure, wherein said correlation information associates the physical address of the destination node to the virtual address of the destination node.

3. The method of claim 1, wherein the unique identifier is used by the destination host to determine the virtual address of the destination node based on the physical address included in the physical header.

4. The method of claim 2, wherein the data structure is a mapping table that maps a virtual address to a physical address in the overlay-based communications network.

5. The method of claim 2, wherein the data structure is accessible by a controller that resolves the physical address from the virtual address based on the correlation information included in the data structure.

6. The method of claim 1, wherein the destination node is guest software running on the destination host, wherein the destination node is connected to the overlay-based communications network.

7. The method of claim 1, wherein the destination host is an overlay tunnel end point.

8. The method of claim 1, wherein the destination host communicates with a controller that resolves the virtual address from the physical address based on correlation information included in a data structure accessible to the controller.

9. The method of claim 1, wherein the virtual address of the destination node is resolved from the physical address based on correlation information communicated between the source node and the destination node.

10. A system for efficient data communication, the system comprising:
one or more processors, one or more non-transitory computer-readable memories, and program instructions stored on the one or more non-transitory computer-readable memories for execution by at least one or more processors the program instructions comprising:
program instructions to receive a data packet to be transmitted to a destination node in an overlay-based communications network, wherein the destination information is included in a virtual header that includes a virtual address of the destination node;
program instructions to determine a physical address of the destination node based on the virtual address of the destination node;
program instructions to determine a payload density of the data packet to be transmitted is below a threshold; based on determining the payload density is below the threshold, program instructions to replace the virtual header for the received data packet with a physical header that includes the physical address and a unique identifier, wherein the unique identifier is determined based on the physical address included in the physical header and the virtual address included in the virtual header; and
program instructions to transmit the data packet over the communications network to a destination host based on the physical address included in the physical header;
wherein the virtual address of the destination node is determined based on the physical address included in the physical header when the data packet is received at the destination host, and
herein a payload included in the data packet is delivered to the destination node via the destination host based on the virtual address of the destination node.

11. The system of claim 10, wherein the virtual address of the destination node is used to resolve the physical address for the destination node based on correlation information included in a data structure, wherein said correlation information associates the physical address of the destination node to the virtual address of the destination node.

12. A computer program product comprising a non-transitory computer readable storage medium storing a computer readable program, wherein the computer readable program when executed on a computer causes the computer to:
receive a data packet to be transmitted to a destination node in a overlay-based communications network, wherein the destination information is included in a virtual header that includes a virtual address of the destination node;
determine a physical address of the destination node based on the virtual address of the destination node;
program instructions to determine a payload density of the data to be transmitted is below a threshold;
based on determining the payload density is below the threshold, replacing the virtual header for the received data packet with a physical header that includes the physical address and a unique identifier, wherein the unique identifier is determined based on the physical address included in the physical header and the virtual address included in the virtual header; and
transmit the data packet over the communications network to a destination host based on the physical address included in the physical header;
wherein the virtual address of the destination node is determined based on the physical address included in the physical header when the data packet is received at the destination host, and
wherein a payload included in the data packet is delivered to the destination node via the destination host based on the virtual address of the destination node.

13. The computer program product of claim 12, wherein the virtual address of the destination node is used to resolve the physical address for the destination node based on correlation information included in a data structure, wherein said correlation information associates the physical address of the destination node to the virtual address of the destination node.

14. The computer program product of claim 12, wherein the unique identifier is used by the destination host to determine the virtual address of the destination node based on the physical address included in the physical header.

15. The method of claim 1, wherein replacing the virtual header for the received data packet with a physical header comprises retrieving information from a cache for a previous packet for a similar data transmission.

16. The computer system of claim 10, wherein replacing the virtual header for the received data packet with a physical header comprises retrieving information from a cache for a previous packet for a similar data transmission.

17. The computer program product of claim 12, wherein replacing the virtual header for the received data packet with a physical header comprises retrieving information from a cache for a previous packet for a similar data transmission.

* * * * *